I. W. GRISCOM.
POTATO BUG DESTROYER.
No. 171,011. Patented Dec. 14, 1875.
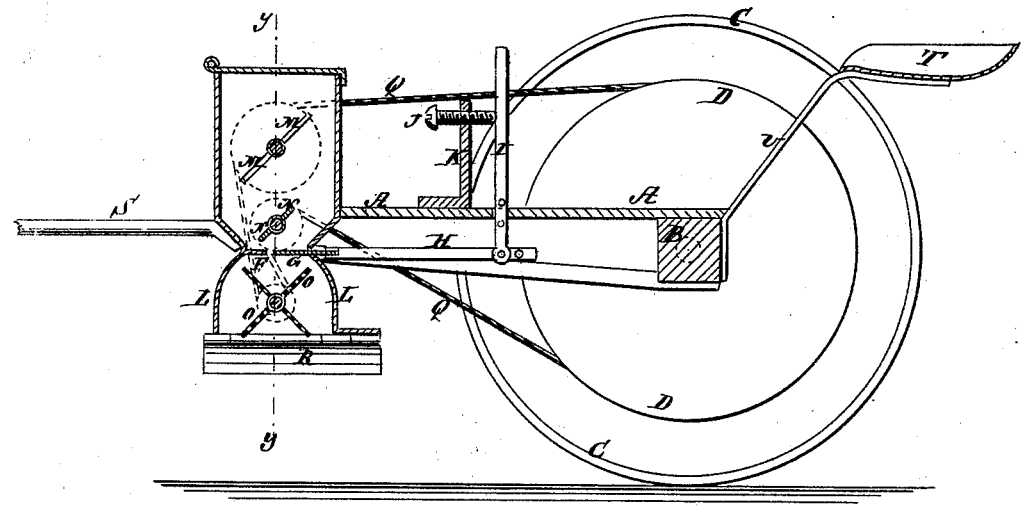
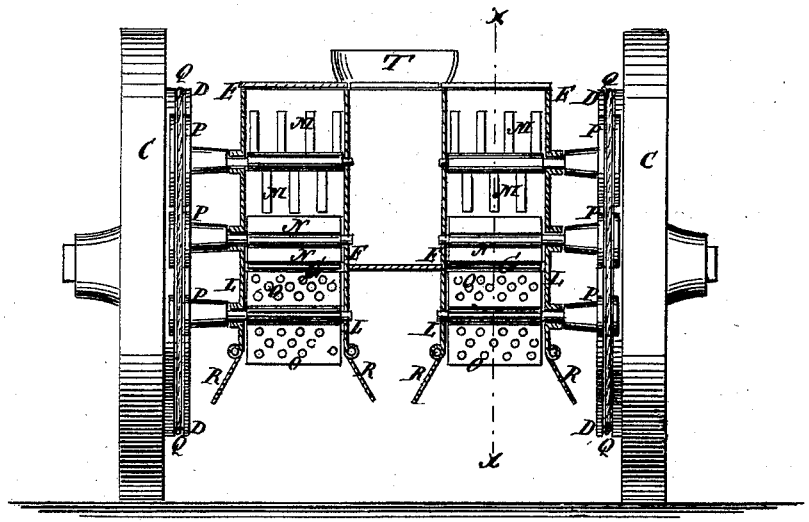
WITNESSES:
E. Wolff
Alex. F. Roberts
INVENTOR:
Isaac W. Griscom
BY
ATTORNEYS.

UNITED STATES PATENT OFFICE.

ISAAC W. GRISCOM, OF WOODBURY, NEW JERSEY.

IMPROVEMENT IN POTATO-BUG DESTROYERS.

Specification forming part of Letters Patent No. 171,011, dated December 14, 1875; application filed October 8, 1875.

*To all whom it may concern:*

Be it known that I, ISAAC W. GRISCOM, of Woodbury, in the county of Gloucester and State of New Jersey, have invented a new and useful Improvement in Potato-Bug Destroyer, of which the following is a specification:

Figure 1 is a vertical longitudinal section of my improved machine, taken through the line $xx$, Fig. 2. Fig. 2 is a vertical cross-section of the same, taken through the line $yy$, Fig. 1.

Similar letters of reference indicate corresponding parts.

The object of this invention is to furnish an improved machine designed especially for applying Paris green or other poisonous powder to plants, but which may also be used for applying fine or powdered fertilizers, and which shall be simple in construction, not liable to get out of order, and convenient and effective in use, applying the powder rapidly and uniformly, and therefore economically.

The invention consists in the combination of the slide, the bar, the pivoted lever, the adjusting-screw, and the rigid upright with the hopper and the platform or frame; in the combination of the stirrer and the feeder with the hopper; in the combination of the distributer with the discharge-chamber of the hopper; and in the combination of the adjustable wings with the discharge-chamber of the hopper, and with the distributer, as hereinafter fully described.

A represents the platform or frame of the machine, to the forward end of which are attached the shafts S, and its rear end is attached to the axle B. Upon the journals of the axle B revolve the wheels C, to the inner sides of which are attached, or upon them are formed, pulleys D. To the forward end of the platform or frame A are attached two—more or less—hoppers, E, according to the number of rows of plants to be operated upon at a time. The lower part of the hoppers E is contracted, and is provided with a stationary plate, F, that forms a portion of its bottom. The other part of the bottom is formed by a sliding plate, G, that passes in through a slot in the rear side of the hoppers E. To the rear edge of the plate G is attached the forward end of a bar, H, the rear end of which is pivoted to the lower end of a lever, I. The levers I pass up through and are pivoted to the platform or frame A, so that they can be conveniently reached and operated to adjust the slide G and regulate the size of the discharge-opening, as may be desired. The levers I are adjusted and held in position by set-screws J, which pass through screw-holes in uprights K, rigidly attached to the platform or frame A. L is the discharge-chamber, which may be a continuation of the hopper E, below the bottom F G. M is the stirrer, consisting of a number of prongs attached to or formed upon a shaft that passes through and is pivoted to the upper part of the hopper E. N is the feeder, which consists of two wings attached to a shaft that passes through and is pivoted to the hopper E, a little above its bottom F G. O is the distributer, which consists of four—more or less—wings of perforated sheet metal, wire-gauze, or other suitable material, attached to a shaft which passes through and is pivoted to the discharge-chamber L below the bottom F G of the hopper E. To the outer ends of the shafts of the stirrer M the feeder N, and the distributer O are attached pulleys P, around which passes a band, Q, which also passes around the pulley D of the drive-wheel C, so that the said stirrer, feeder, and distributer may be driven by the advance of the machine. The pulleys and band may be replaced by gear-wheels, if desired. To the lower edges of the sides of the discharge-chamber L are hinged wings R, which are designed to project downward at the sides of the rows of plants, to prevent the powder from scattering or being blown away by the wind before reaching the plants. The wings R may be adjusted in any desired position according to the size of the plants. T is the driver's seat, the standard U of which is attached to the rear end of the platform or frame A, or to the axle B, so that the driver's weight may balance the machine.

Having thus described my invention, I claim as new and desire to secure by Letters Patent—

1. The combination of the slide G, the bar H, the pivoted lever I, the adjusting-screw J, and the rigid upright K with the hopper E F and the platform or frame A, substantially as herein shown and described.

2. The combination, with discharge-chamber L, of a distributer, O, consisting of perforated blades or beaters, as shown and described, in order that the powder may be struck as it falls and atomize before it reaches the plants.

3. The combination, in a hopper having lower discharge-chamber, of stirrer M, feeder N, and distributer O, arranged substantially as and for the purpose specified.

ISAAC W. GRISCOM.

Witnesses:
ELIZABETH W. GRISCOM,
JNO. H. BRADWAY.